(12) United States Patent
Khoryaev et al.

(10) Patent No.: US 11,979,883 B2
(45) Date of Patent: May 7, 2024

(54) DOWNLINK (DL) POSITIONING REFERENCE SIGNAL (PRS) RESOURCE CONFIGURATION AND MEASUREMENT IN NEW RADIO (NR) SYSTEMS

(71) Applicant: Intel Corporation, Santa Clara, CA (US)

(72) Inventors: Alexey Khoryaev, Nizhny Novgorod NIZ (RU); Sergey Sosnin, Zavolzhie NIZ (RU); Mikhail Shilov, Nizhny Novgorod NIZ (RU); Sergey Panteleev, Nizhny Novgorod NIZ (RU); Artyom Putilin, Kstovo (RU); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 16/993,032

(22) Filed: Aug. 13, 2020

(65) Prior Publication Data

US 2020/0374850 A1 Nov. 26, 2020

Related U.S. Application Data

(60) Provisional application No. 62/887,441, filed on Aug. 15, 2019, provisional application No. 62/887,435, filed on Aug. 15, 2019.

(51) Int. Cl.
*H04W 72/04* (2023.01)
*H04W 64/00* (2009.01)
*H04W 72/08* (2009.01)
*H04W 72/23* (2023.01)
*H04W 72/51* (2023.01)

(Continued)

(52) U.S. Cl.
CPC ......... *H04W 72/23* (2023.01); *H04W 64/003* (2013.01); *H04W 72/51* (2023.01); *H04W 72/54* (2023.01); *H04W 74/006* (2013.01)

(58) Field of Classification Search
CPC ...... H04L 5/0023; H04L 5/005; H04W 24/10; H04W 64/003; H04W 72/042; H04W 72/048; H04W 72/08; H04W 74/006
See application file for complete search history.

(56) References Cited

U.S. PATENT DOCUMENTS

2019/0280899 A1* 9/2019 Kumar ................. H04L 1/0009
2019/0297489 A1* 9/2019 Lei ......................... H04W 8/24
2021/0050963 A1* 2/2021 Zarifi ................ H04L 25/0224
(Continued)

OTHER PUBLICATIONS

3GPP, "Technical Specification Group Radio Access Network; NR; Physical layer procedures for data (Release 15)," 3GPP TS 38.214 V15.6.0 (Jun. 2019), 5G, 105 pages.

*Primary Examiner* — Awet Haile
(74) *Attorney, Agent, or Firm* — Schwabe, Williamson & Wyatt, P.C.

(57) ABSTRACT

Methods, systems, and storage media are described for new radio downlink positioning reference signal (NR DL PRS) resource allocation and configuration. In particular, some embodiments relate to some embodiments relate to NR DL PRS resource configurations such as comb size, number of symbols, DL PRS resource time configuration (e.g., initial start time and periodicity), and providing formulas for calculation of seed for DL PRS sequence generation. Other embodiments may be described and/or claimed.

16 Claims, 13 Drawing Sheets

(51) Int. Cl.
*H04W 72/54* (2023.01)
*H04W 74/00* (2009.01)

(56) References Cited

U.S. PATENT DOCUMENTS

| | | | |
|---|---|---|---|
| 2021/0051622 A1* | 2/2021 | Manolakos | H04W 24/10 |
| 2021/0076359 A1* | 3/2021 | Sosnin | G01S 19/42 |
| 2021/0282111 A1* | 9/2021 | Yamada | H04W 64/003 |
| 2021/0352613 A1* | 11/2021 | Yoon | H04L 5/0032 |
| 2021/0410097 A1* | 12/2021 | Munier | H04W 64/00 |
| 2022/0086601 A1* | 3/2022 | Qi | H04L 5/0048 |
| 2022/0116089 A1* | 4/2022 | Khoryaev | H04B 7/0695 |
| 2022/0191830 A1* | 6/2022 | Khoryaev | H04L 5/0098 |
| 2022/0224498 A1* | 7/2022 | Cha | H04L 5/0092 |

* cited by examiner

100

Retrieving downlink (DL) positioning reference signal (PRS) configuration information that includes an indication of a DL PRS resource associated with a spatial transmission filter
105

Encoding a message for transmission to a user equipment (UE) that includes the DL PRS configuration information
110

200

Determining downlink (DL) positioning reference signal (PRS) configuration information that includes an indication of a DL PRS resource associated with a spatial transmission filter
205

Encoding a configuration message for transmission to a user equipment (UE) that includes the DL PRS configuration information
210

FIG. 2

DOWNLINK (DL) POSITIONING REFERENCE SIGNAL (PRS) RESOURCE CONFIGURATION AND MEASUREMENT IN NEW RADIO (NR) SYSTEMS

RELATED APPLICATIONS

This application claims priority to U.S. Provisional Patent Application No. 62/887,441 filed Aug. 15, 2019 and entitled "RESOURCE SCHEDULING PROCEDURE FOR NR POSITIONING," and to U.S. Provisional Patent Application No. 62/887,435 filed Aug. 15, 2019 and entitled "DOWNLINK (DL) POSITIONING REFERENCE SIGNALS (PRS) RESOURCE CONFIGURATION AND MEASUREMENT IN NEW RADIO (NR) SYSTEMS," the entire disclosures of which are incorporated by reference in their entirety.

FIELD

Embodiments of the present disclosure relate generally to the technical field of wireless communications.

BACKGROUND

Among other things, embodiments of the present disclosure relate to directed to new radio downlink positioning reference signal (NR DL PRS) resource allocation and configuration. In particular, some embodiments relate to NR DL PRS resource configurations such as comb size, number of symbols, DL PRS resource time configuration (e.g., initial start time and periodicity), and providing formulas for calculation of seed for DL PRS sequence generation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 1:
Figure 1:

Among other things, embodiments of the present disclosure relate to radio downlink positioning reference signal (NR DL PRS) resource allocation and configuration. In particular, some embodiments relate to some embodiments relate to NR DL PRS resource configurations such as comb size, number of symbols, DL PRS resource time configuration (e.g., initial start time and periodicity), and providing formulas for calculation of seed for DL PRS sequence generation. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Downlink (DL) Positioning Reference Signals (PRS) Resource Configuration and Measurement in New Radio (NR) Systems Modern wireless communication networks are designed to provide high quality services consuming minimum amount of resources, therefore the procedures enabled in that wireless communication systems should be optimized and efficient.

Support of mechanisms for calculation of accurate user coordinate is one of the embedded component of modern wireless communication systems like 5G. The procedure of resource management should be flexible and efficient in order to maintain required quality of service (QoS).

The resource allocation and configuration is one of the important aspect of the any wireless positioning services. Among other things, embodiments of the present disclosure are directed to new radio downlink positioning reference signal (NR DL PRS) resource allocation and configuration, along with remaining details on measurement aspects, like the principle of quality calculation criteria In some embodiments, NR DL PRS resource configuration may provide options for PRS resource allocation. The present disclosure proceeds by providing a description and examples of benefits for each option, describing the resource element mapping pattern for each configuration of Comb-N and number of symbols, defining DL PRS resource time configuration (initial start time and periodicity) and providing formulas for calculation of seed for DL PRS sequence generation. Additionally, in the second part of the document, details on measurement calculation quality criteria is provided.

DL PRS Resource Configuration Aspects 1.1 DL PRS Resource Allocation

The following options are considered for DL PRS Resources and DL PRS Resource Set allocation in DL PRS occasions.

Figure 4A:
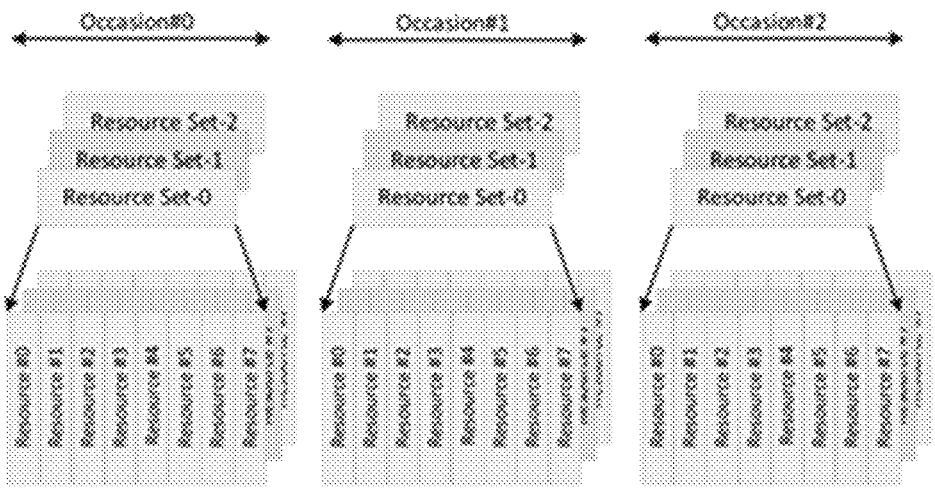
FIG. 4A illustrates an example of DL PRS resource allocation option 1, where a DL PRS resource set allocates DL PRS resources with the same DL Tx spatial filter inside a DL PRS occasion in accordance with some embodiments.

Option 1: DL PRS Resource Set allocates DL PRS Resources w/the same DL TX spatial filter inside DL PRS occasion (see, e.g., FIG. 4A). This enables gNB TX sweeping across DL PRS Resource Sets and UE RX sweeping across DL PRS Resources of configured DL PRS Resource Set per single occasion.

Figure 4B:
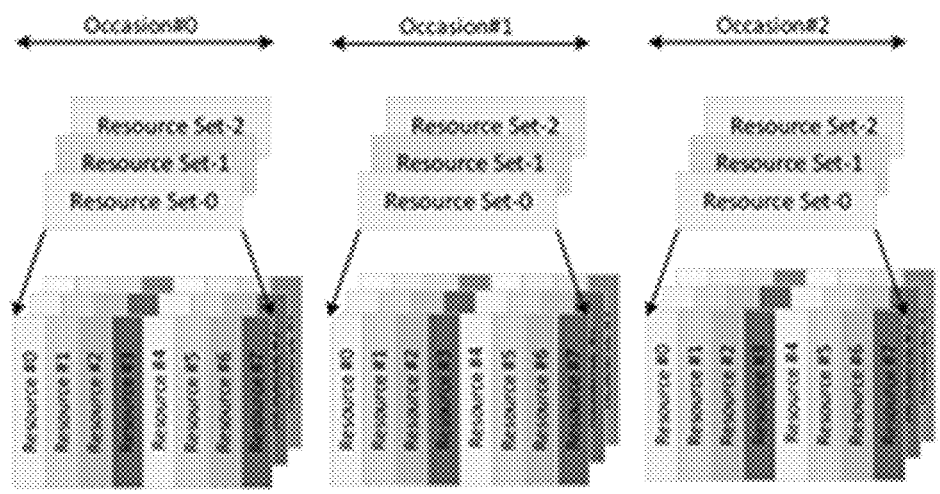
FIG. 4B illustrates an example of DL PRS resource allocation option 2, where a DL PRS resource set allocates DL PRS resources with a different DL Tx spatial filter inside a DL PRS occasion in accordance with some embodiments.

Option 2: DL PRS Resource Set allocates DL PRS Resources w/different DL TX spatial filters inside DL PRS occasion (see, e.g., FIG. 4B). This enables gNB TX sweeping across DL PRS Resources of DL PRS Resource Set and UE RX sweeping across DL PRS occasions.

Figure 4C:
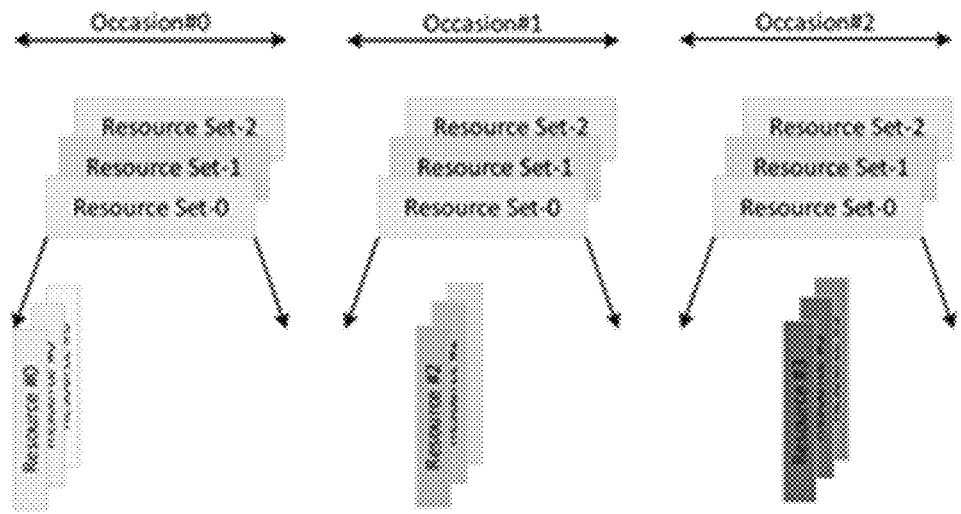
FIG. 4C illustrates an example of DL PRS resource allocation option 3, where a DL PRS resource set allocates DL PRS resources with a different DL Tx spatial filter across multiple DL PRS occasions in accordance with some embodiments.

Option 3: DL PRS Resource Set allocates DL PRS Resources w/different DL TX spatial filters across multiple DL PRS occasions (see, e.g., FIG. 4C). This enables gNB TX sweeping across DL PRS Resources mapped to different DL PRS occasions and UE RX sweeping across DL PRS occasions cycles.

Figure 4D:
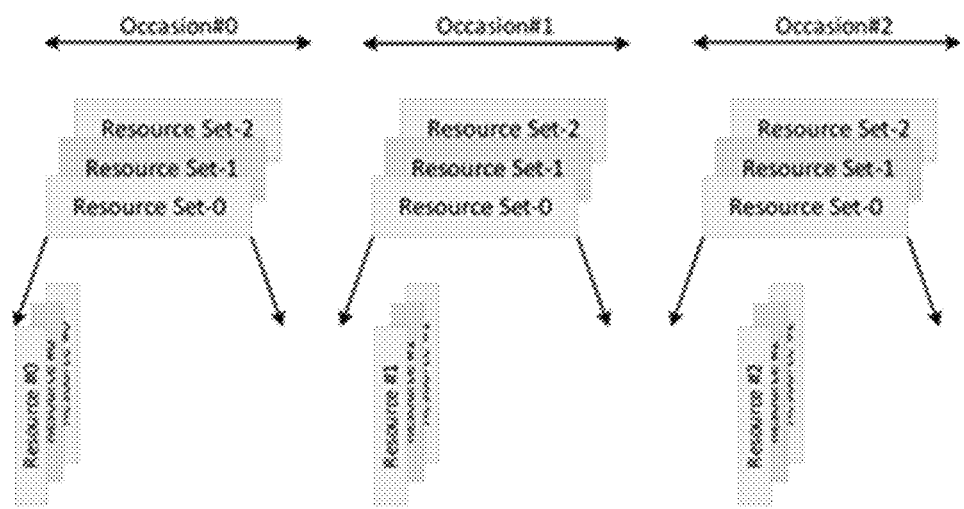
FIG. 4D illustrates an example of DL PRS resource allocation option 1, where a DL PRS resource set allocates DL PRS resources with the same DL Tx spatial filter across multiple DL PRS occasion in accordance with some embodiments.

Option 4: DL PRS Resource Set allocates DL PRS Resources w/the same DL TX spatial filter across multiple DL PRS occasions (see, e.g., FIG. 4D). This enables gNB TX sweeping across DL PRS Resource Sets mapped to DL PRS occasions and UE RX sweeping across DL PRS occasions cycles.

The options described above may have a tradeoff in terms of latency to complete full TX-RX sweep procedure, amount of allocated resources per DL PRS occasion and possibly transmission density. Assuming that transmission density per resource is the same analysis of latency vs number of resources is presented below in Table 1.

TABLE 1

Analysis of DL PRS Resource Allocation Options

| DL PRS Resource Allocation Option | Number of DL PRS resources per DL PRS occasion per single TRP | Number of DL PRS occasions for spatial relation acquisition (Beam pairing latency) |
|---|---|---|
| Option 1 | $N_{TX\_SW} N_{RX\_SW}$ | DL PRS occasion period |
| Option 2 | $N_{TX\_SW}$ | $N_{RX\_SW}$ DL PRS occasions |
| Option 3 | 1 | $N_{TX\_SW} N_{RX\_SW}$ DL PRS occasions |
| Option 4 | 1 | $N_{TX\_SW} N_{RX\_SW}$ DL PRS occasions |

In Table 1, $N_{TX\_SW}$—number of DL TX beams, $N_{RX\_SW}$—number of DL RX beams. In some embodiments, from an NR DL Positioning performance and design perspective, Option 1 and Option 2 may be the most attractive.

1.2 Resource Element Offset in Frequency Domain

Figure 4E:
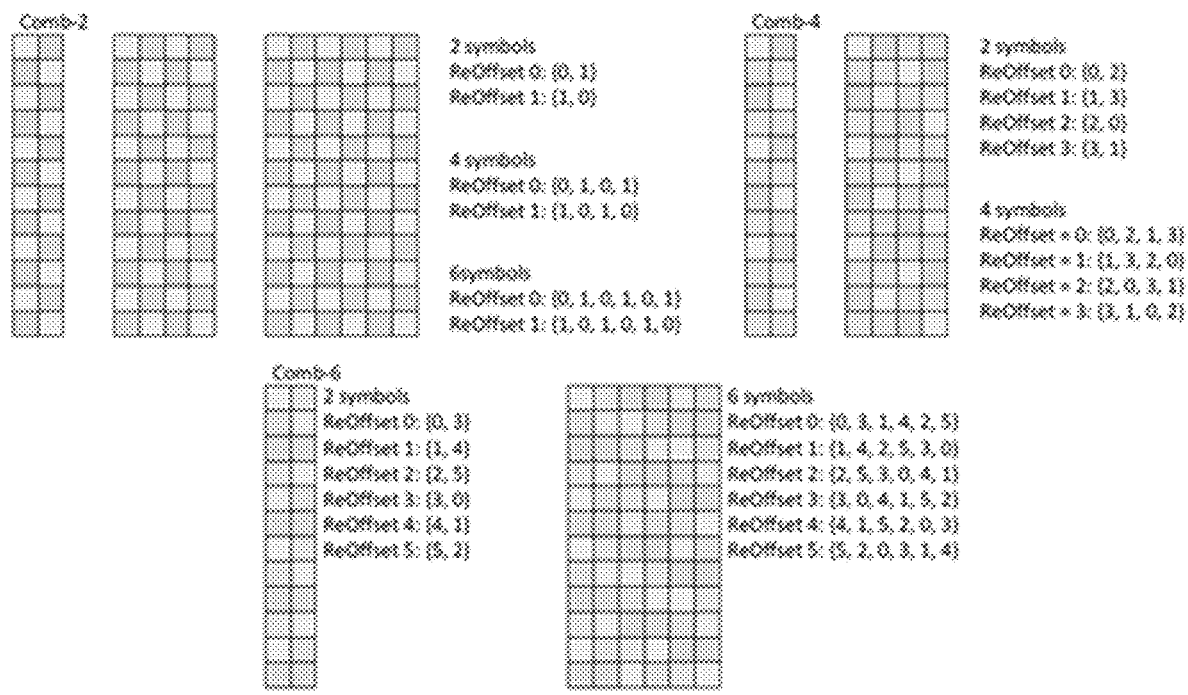
FIG. 4E illustrates an example of RE patterns for DL PRS resources in accordance with some embodiments.

RAN1 agreed on configurable comb-size N and number of symbols M per DL PRS Resource. The next table provides examples of RE Offset patterns that are supported by NR Positioning, and FIG. 4E illustrates examples of several patterns.

TABLE 2

Resource Element Patterns for DL PRS Transmission

|  |  | Comb Size-N | | |
| --- | --- | --- | --- | --- |
|  |  | 2 | 4 | 6 |
| Number of symbols per DL PRS Resource M | 2 | {0, 1} | {0, 2} | {0, 3} |
|  | 4 | {0, 1, 0, 1} | {0, 2, 1, 3} | NA |
|  | 6 | {0, 1, 0, 1, 0, 1} | NA | {0, 3, 1, 4, 2, 5} |

1.3 Starting Slot and Symbol of DL PRS Resource

The starting slot and symbol of DL PRS Resource within a given DL PRS Resource Set is indicated by time offset to the starting symbol of DL PRS Resource. Time offset of DL PRS Resource is defined with respect to the time offset of DL PRS Resource Set where that time offset of DL PRS Resource Set is defined relative to SFN-0 timing of serving cell. The time offset of DL PRS Resource point to slot and starting symbol within a slot and thus is represented by slot and symbol offsets: Starting symbol offset: 0-13 symbols; Starting slot offset: 0—(Periodicity-1) slots, where "Periodicity" is configurable parameter.

1.4 Periodicity of DL PRS Resource Allocation

All DL PRS Resources that belong to DL PRS Resource Set have the same common periodicity. The following periodicities of DL PRS Resource allocation in slots are provided:

15 kHz SCS: {5, 10, 20, 40, 80, 160, 320, 640, 1280, 2560} slots 30 kHz SCS: {10, 20, 40, 80, 160, 320, 640, 1280, 2560, 5120} slots 60 kHz SCS: {20, 40, 80, 160, 320, 640, 1280, 2560, 5120, 10240} slots 120 kHz SCS: {20, 40, 80, 160, 320, 640, 1280, 2560, 5120, 10240, 20480} slots In order to be consistent with CSI-RS configuration settings, the additional periodicity values are supported {4, 8, 16, 32, 64}. The proposed above periodicities may be defined at either DL PRS Resource Set level or above.

1.5 DL PRS Sequence Generation

Following formula is used for calculation of initialization seed for DL PRS generation, assuming that maximum number of possible PRS IDS is limited with 4095, e.g. $N_{PRS\_ID} \in \{0 \ldots 4095\}$:

$$c_{init} = 2^{12} \cdot (14(n_{s,f}^{\mu}+1)+l+1) \cdot (N_{PRS_{ID}} \bmod 256+1) + N_{PRS_{ID}}$$

where $N_{PRS\_ID}$ (Resource or Resource Set ID), TRP specific parameter for positioning configuration, $n_{s,f}^{\mu}$—slot number within a frame, l—symbol index inside of the slot.

In case of extended PRS ID set $N_{PRS\_ID} \in \{0 \ldots 8191\}$, following formula is used for calculation of initialization seed for DL PRS generation:

$$c_{init} = 2^{13} \cdot (14(n_{s,f}^{\mu}+1)+l+1) \cdot (N_{PRS_{ID}} \bmod 128+1) + N_{PRS_{ID}}$$

where equals $N_{PRS\_ID}$ (Resource or Resource Set ID), TRP specific parameter for positioning configuration, $n_{s,f}^{\mu}$—slot number within a frame, l—symbol index inside of the slot.

Figure 4F:
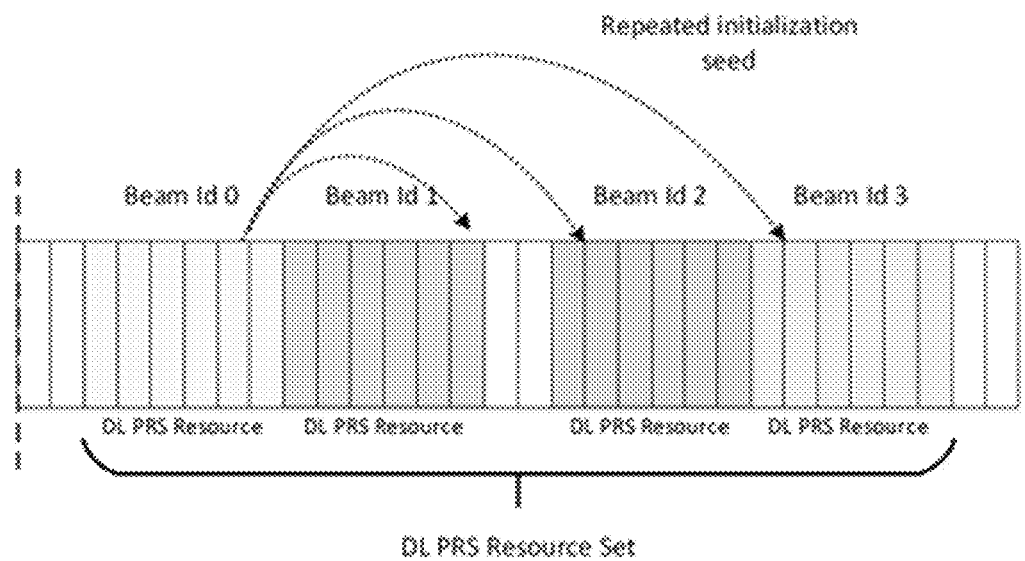
FIG. 4F illustrates an example of initialization seed assignment for resources with different spatial filters in accordance with some embodiments.

In case of DL PRS transmission with different or the same spatial filter(s) in different PRS Resources inside one PRS Resource Set, the initialization seed for each PRS resource is same as the initialization seed for the first PRS resource, as depicted in FIG. 4F.

Aspects of DL PRS Measurement Quality Calculation

Basic metrics that can serve as indicators of quality of measurement are RSRP and SINR. For NR positioning, these metrics can be generalized and introduced for the first arrival path. For aperiodic measurement and reporting, these metrics is the only possible option for aperiodic reporting.

In LTE, the OTDOA-MeasQuality metric is defined to characterize quality of OTDOA measurements. This metric includes three fields:

Error-Resolution;

Error-Value (best estimate of the uncertainty of the OTDOA (or TOA) measurement); and Error-NumSamples (specifies how many measurements have been used by the target device to determine this).

In general, if RSTD or other measurement is reported periodically, the quality of measurement can be estimated at the network side. For that reason it is not very clear why these measurements should be separately signaled by UE/gNB. One potential motivation is that each measurement can be performed under different RSRP and SINR environment which is may not be known to the entity that performs coordinate estimation. On the other hand if SINR and RSRP values change dramatically from one measurement occasion to another then measurement of standard deviation or uncertainty may not lead to the desired effect and the instantaneous SINR and RSRP measurements may be a better indicators of quality.

The LTE approach can be extended for all NR positioning measurements and applied for periodic and semi-persistent reporting of positioning measurements. These measurements can be defined at the Resource or Resource Set (e.g. DL PRS or UL SRS Resource/Resource Set level). In addition, instead of uncertainty (error-value) it is defined standard deviation which is estimated over a certain amount of measurements assuming zero mean or assuming that mean value is estimated. In some embodiments, a network may control the number of samples that UE should use for reporting of measurement quality. This may be needed especially for mobile UEs where RSTD values may significantly change over time and therefore STD estimation over large time window may not have any meaning. Finally, considering that many of algorithms for timing or angle estimation are based on thresholds it may often happen that collection of measurements has outliers (e.g., that belong to tails of distributions). In order to cope with these effects, some embodiments may remove Y=10% of outlier measurement when STD is estimated.

Resource Scheduling Procedure for NR Positioning

Some embodiments described herein provide a detailed mechanism for flexible and efficient scheduling of NR DL/UL PRS resources, two scheduling algorithms are provided: predefined and pseudo-random. The main principles is to optimize the number of active nodes per resource and randomize the combination of interference nodes in different PRS occasions (periods). Additionally, new algorithm for PRS resource muting is provided, which helps Some embodiments described herein may be directed to a new mechanism for DL positioning reference signal (PRS)

transmission scheduling, which may provide efficient resource utilization for each enabled in positioning transmission node in conditions of dense interference environment. The design principles are based on permutation of combination of nodes interfering with each other on the same transmission resources, keeping proportional resource utilization dedicated for positioning reference signal. Additionally, a pseudo random scheduling mechanism for non-optimized PRS planning is provided.

1. DL PRS Resource Configuration Aspects
2. DL PRS Transmission Schedule

Embodiments that include details on transmission schedule and muting principles for NR positioning are discussed below.

In some embodiments, it may be beneficial for an NR system to support two modes for DL PRS transmission:

Predefined DL PRS Transmission Mode: In this mode, it is assumed that TRPs (identified by PRS IDs) are intelligently mapped to allocated orthogonal PRS resources for PRS transmission. The DL PRS transmission schedule is automatically determined by UE for each DL PRS occasion once PRS resources are configured. This mode of operation enables optimal planning of the deployment and PRS transmissions in dedicated positioning areas.

Randomized (or pseudo-randomized) DL PRS Transmission Mode: Randomized DL PRS transmission mode can be used in deployment scenarios not optimized for positioning, e.g. without special considerations on deployment planning to maximize positioning performance. In this mode PRS ID mapping to PRS resources may be suboptimal.

In general, embodiments for DL PRS scheduling described herein can be applied for UL PRS (SRS) scheduling in order to optimize the UL positioning performance in interference congested scenarios and to decrease the control signaling.

2.1 Predefined DL PRS Transmission Mode

The predefined PRS transmission mode distributes PRS transmissions from all stations across configured orthogonal PRS resources (e.g., maps unique PRS IDs/station IDs to allocated PRS resources or resource sets). In order to optimize performance, all transmitting stations ($N_{PRS-ID}$) should be equally distributed across N orthogonal resources (e.g. $N=N_T N_F$ orthogonal time frequency resources) allocated for transmission (note either DL PRS Resources or DL PRS Resource Sets can be mapped to orthogonal resource). In general, this problem is similar to finding K combinations out of $N_{PRS-ID}$ length sequence (e.g. combinations of $K=\text{floor}(N_{PRS-ID}/(N))$ stations out of NPRS-ID stations). However simply finding arbitrary combinations is not sufficient. In order to optimize positioning performance, a technique is to ensure that each station has one transmission opportunity in N allocated resources. In addition, at the next transmission window opportunity (e.g. DL PRS occasion or repetitions of DL PRS Resource Set), the new unique combinations of transmitting stations should occupy allocated orthogonal resources.

If the number of orthogonal resources is a prime number P, then at least P2 combinations (each of K stations/IDs) with no more than one intersecting element if K≤P and nor more than ceil(K/P) intersecting elements if P<K can be analytically found. In fact, if K≤P it is possible to form P groups, each composed of P combinations, where combinations in each group do not have intersecting elements (e.g. unique combinations within a group). This is an optimal framework to build PRS transmission schedule and optimize positioning performance of NR system. If (P<K) then there is a maximum of floor(K/P) intersecting elements among any two combinations of different groups. In order to avoid multiple intersections among combinations, each combination can be divided into floor(K/P) sub-combinations intersecting by nor more than one element. The corresponding notations and analytical framework are provided in the following section.

2.1.1 Mapping of PRS IDs in Predefined DL PRS Transmission Schedule

The following notations to define mapping of PRS IDs to orthogonal PRS Resources across multiple occasions:

$N_{PRS-ID}$—maximum number of PRS IDs supported by specification;

$I_{PRS-ID}$—set of all PRS IDs, ={0, 1, . . . , $N_{PRS-ID}$−1};

P—is the number of orthogonal resources per occasion. In order to form P groups (each composed of P combinations of K—length sequences), the P should be the largest prime number which is ≤floor($N_{PRS-ID}/K$);

$K=\text{floor}(N_{PRS-ID}/(N_T N_F))$—number of PRS IDs per orthogonal resource;

$\hat{w}$—is the index of PRS transmission occasion within SFN cycle period $0 \leq \hat{w} \leq \hat{w}_{max}-1$;

$\hat{w}_{max}$ max is the maximum number of PRS transmission occasions per SFN cycle;

w—is the index that identifies group of P combinations to be used on occasion $\hat{w}$; w=mod($\hat{w}$,P), 0≤w≤(P−1);

i—is the logical index of PRS resource within transmission occasion 0≤i≤(P−1);

S(w, i)—combination of PRS IDs mapped to i-th PRS resource in occasion w;

Using notations above, the mapping of PRS IDs to orthogonal PRS resources can be generalized by the following equations:

$$\text{ind}(n,i,w) = n + K \cdot \text{mod}(n \cdot w + i, P)$$

$$S(w,i) = \{I_{PRS}(\text{ind}(n,i,w))\}; n=0,1,2,\ldots,(K-1)$$

$$w=0,1,2,\ldots,(P-1); i=0,1,2,\ldots,(P-1)$$

The above equations generate P combinations of PRS IDs for P PRS occasions, where each combination is of length K. The alternative option is to use equivalent equation below that generates logical index i of PRS resource for each PRS ID $I_{PRS-ID}(m)$ and each occasion 0≤w≤(P−1):

$$i(I_{PRS-ID}(m), w) = \text{mod}\left(I_{PRS-ID}(m) + w \cdot \text{floor}\left(\frac{I_{PRS-ID}(m)}{P}\right) \cdot (P-1), P\right);$$

$$m = 0, 1, \ldots, N_{PRS-ID} - 1; w = 0, 1, 2, \ldots, (P-1)$$

2.2 Randomized DL PRS Transmission Mode

Randomized DL PRS transmission mode can be useful in deployment scenarios not optimized for positioning e.g. without special considerations on dedicated deployment planning to maximize positioning performance. In this mode, the resource used for PRS transmission by a given PRS ID is an output of the pseudo-random generator. This mode of operation does not ensure nice properties that can be provided by the predefined transmission mode such as 1) uniform loading across orthogonal PRS resources and 2) transmission of unique sets of TRPs across different PRS occasions and thus may require more spectrum resources to achieve similar performance. On the other hand this mode may require less specification efforts while providing sufficient performance in many scenarios.

The simple way to implement randomized DL PRS transmission mode is to use uniform pseudo random generator with predefined initialization procedure to generate resource index to be used by given PRS ID in a given occasion.

The pseudo random selection procedure of DL PRS transmission resource can be based on the following formula:

$$i(I_{PRS-ID}(m), \hat{w}) = \mod\left(\text{floor}\left(\frac{x[\hat{w}]}{P}\right), P\right);$$

$$m = 0, 1, \ldots, N_{PRS-ID} - 1; \hat{w} = 0, 1, 2, \ldots, \hat{w}_{max}$$

Where values of x are obtained from pseudo random generator which is based on following equation:

$$x[n] = \mod(a \cdot x[n-1], b); x[-1] = \mod(a \cdot (I_{PRS-ID}(m)+1), b)$$

Where a and b are predefined numbers, a=39827, b=65537.

2.3 Hopping of DL PRS Transmissions of DL PRS Resource Set

Figure 4G:
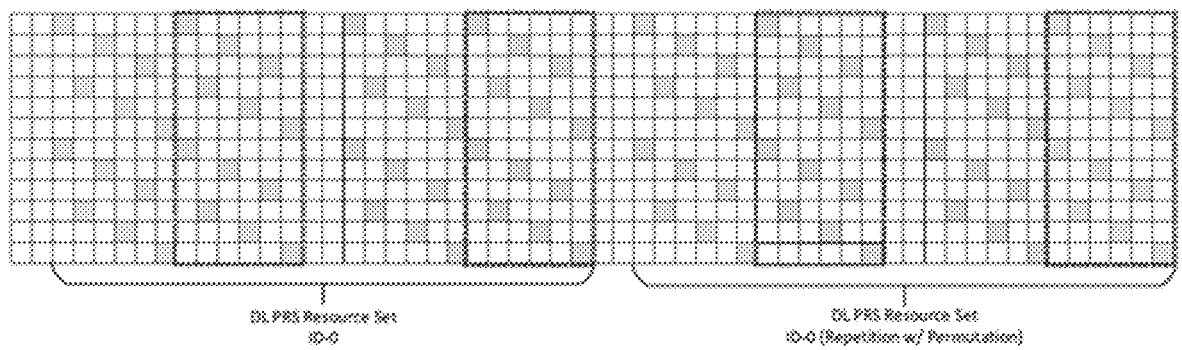
FIG. 4G illustrates an example of beam hopping across resources of a DL PRS resource set in accordance with some embodiments.

DL PRS Resource Set defines multiple DL PRS Resources representing spatial beams of a TRP. When TX beam sweeping is supported it is desirable to randomize spatial interference from different TRPs across multiple PRS occasions or across DL PRS Resource Set repetitions. FIG. 4G illustrates an example of beam hopping across resources of a DL PRS resource set.

2.3.1 Hopping Option 1

Beamforming (Beam Id) is strictly associated with Resource Id and the time and frequency offsets can vary with different occasions. The position calculation of time, frequency or combination of those is based on TRP specific function.

Assume that initial (w=0) set of time and frequency offsets for TRP is represented in following forms:

$T_0 = \{\text{TimeOffset } \#0, \text{TimeOffset } \#1, \text{TimeOffset } \#N_R-1\}$
$F_0 = \{\text{FreqOffset } \#0, \text{FreqOffset } \#1, \text{FreqOffset } \#N_R-1\}$ NR—Number of DL PRS Resources within DL PRS Resource Set. In order to configure a set of new time and frequency offsets for w PRS occasion, following TRP specific procedure for can be applied:

Pseudo Random Selection Procedure $$T_w[n] = T_{w-1}[r_T[n]], n=0,1, \ldots N_R-1$$

$$F_w[n] = F_{w-1}[r_F[n]], n=0,1, \ldots N_R-1, \text{ where}$$

$T_{w-1}, F_{w-1}$—time and frequency offset sets for w−1 occasion;
$r_T, r_F$—vectors of randomly permuted indexes from 0 to $N_R-1$ dedicated respectively for $T_w$ and $F_w$ sets.

Deterministic Selection Procedure $$T_w = [T_{w-1}[\mod(n+\Delta_T, N_R)]], n=0,1, \ldots N_R-1$$

$$F_w = [F_{w-1}[\mod(n+\Delta_F, N_R)]], n=0,1, \ldots N_R-1, \text{ where}$$

$T_{w-1}, F_{w-1}$—time and frequency offset sets for w−1 occasion;
$\Delta_T, \Delta_F$—TRP specific time and frequency offset index permutation parameter.

The number of FDMed resources with different beams configured by the time and frequency changing procedure should not exceed the maximum number of beams simultaneous supported for transmission by TRP.

2.3.2 Hopping Option 2.

Time and frequency offsets are strictly associated with Resource Id and Beamforming (Beam Id) can vary with different occasions. The calculation of beam Id is based on function, which depends on occasion Id, number of possible beams per Resource Set and initial assignment of beams per resources (occasion id=0).

Assume that initial (w=0) set of beam Ids is applied in active Resource Set by a TRP $B_0 = \{\text{Beam Id } \#0, \text{Beam Id } \#1, \ldots, \text{Beam Id } \#N_{BF}-1\}$, $N_{BF}$—number of possible spatial filters applied for DL PRS transmission. In order to configure a set of beam Ids for w PRS occasion, following TRP specific procedure for can be applied:

Pseudo Random Selection Procedure $$B_w[n] = B_{w-1}[r_w^m[n]], n=0,1, \ldots N_{BF}-1, \text{ where}$$

$B_{w-1}$—beam Id set for w−1 occasion;
$r_w^m$—vector of randomly permuted indexes for occasion w for PRS ID=(values: from 0 to $N_{BF}-1$);

Deterministic Selection Procedure $$B_w = [B_{w-1}[\mod(n+\Delta_{BF}, N_{BF})]], n=0,1, \ldots N_{BF}-1,$$
where $B_{w-1}$—beam Id set for w−1 occasion;
$\Delta_{BF}$—TRP specific beamforming index permutation parameter;

Calculation of randomly permuted index vector $r_w^m$ corresponds to the following procedure:

Initialize vector r as $r_w^m[n]=n$, n=0, 1, … $N_{BF}-1$;
for i from 0 to $N_{BF}-2$
Choose randomly uniformly generated integer $$j = i + \mod\left(\text{floor}\left(\frac{x[w \cdot N_{BF} + i]}{N_{BF}}\right), (N_{BF} - i)\right)$$

$$x[w \cdot N_{BF} + i] = \mod(a \cdot x[w \cdot N_{BF} + i - 1], b),$$

where $$x[-1] = \mod(a \cdot (N_{PRS-ID}+I_{PRS-ID}(m)+1), b), a=39827, b=65537;$$

Swap $r_w[i]$ and $r_w[j]$

3. DL PRS Muting

For muting, some embodiments may assume that a bitmap pattern (similar to LTE Positioning) is configured where each bit is associated with certain time instance (occasion or repetition). The one-to-one correspondence between DL PRS Resource/Resource Set and its muting on DL PRS occasion or DL PRS Resource Set repetition is assumed.

3.1 Resource Level Muting

Figure 4H:
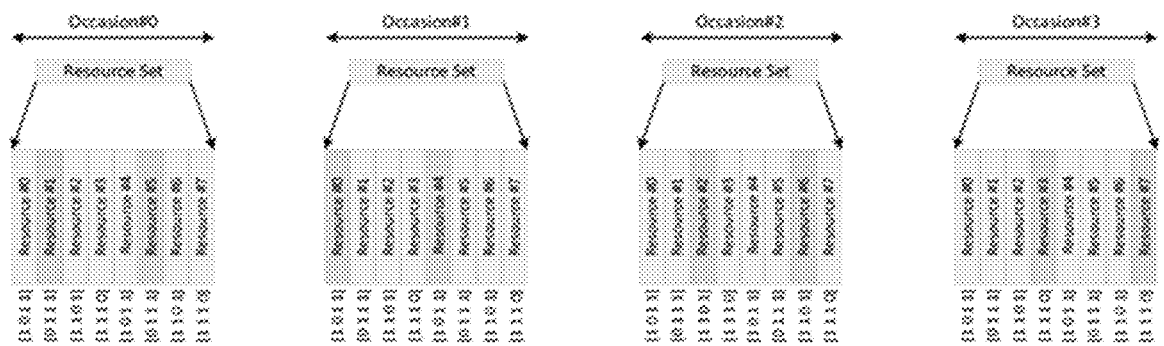
FIG. 4H illustrates an example of resource muting using a bitmap muting pattern per DL PRS resource in accordance with some embodiments.
Figure 4I:
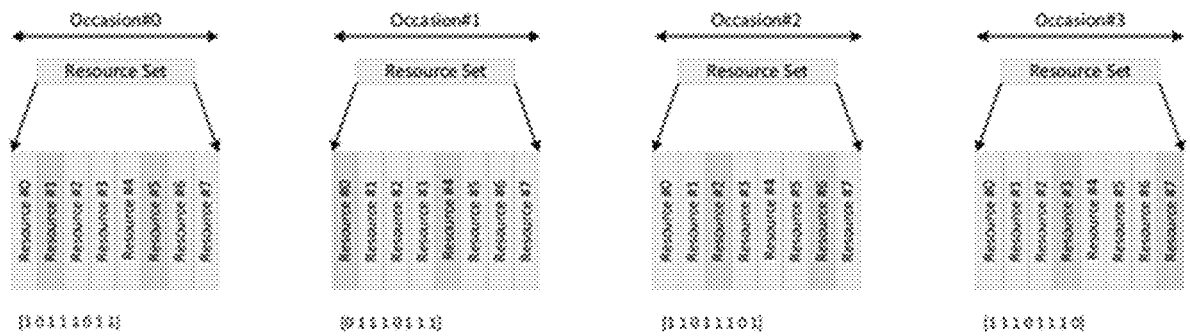
FIG. 4I illustrates an example of resource muting using a bitmap muting pattern per DL PRS resource set in accordance with some embodiments.

A muting pattern can be applied on a DL PRS Resource level, where the muting rule is capable to activate or deactivate subset of DL PRS Resources inside of DL PRS Resource Set. FIG. 4H and FIG. 4I illustrate two examples of DL PRS Resource based muting. The first example assumes that bitmap pattern is defined per DL PRS resource and periodically applied across occasions. The second example assumes that bitmap pattern is configured per DL PRS Resource Set and the rule is defined to derive the pattern from one occasion to another occasion.

Resource Set Level Muting

Figure 4J:
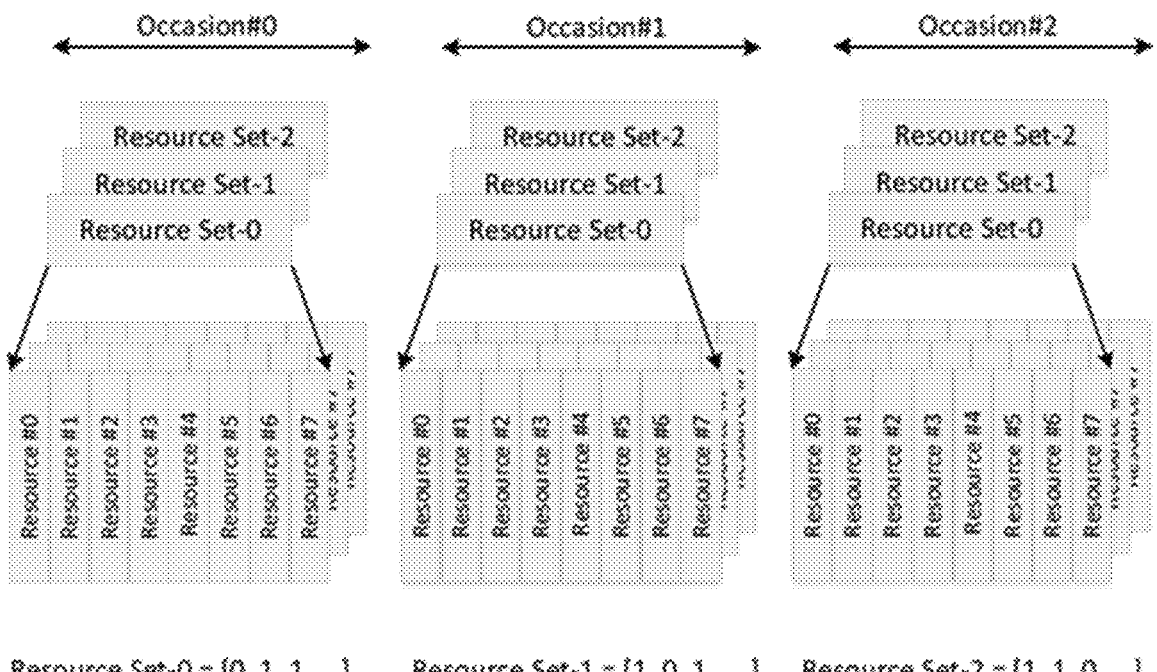
FIG. 4J illustrates an example of DL PRS resource set muting in accordance with some embodiments.

A muting process can be applied on a DL PRS Resource Set level as illustrated in FIG. 4J. In this example, each DL PRS Resource Set is configured with bitmap pattern that control transmission of TRP on given DL PRS Resource Set on each DL PRS occasion or repetition.

If muting is applied per DL PRS Resource Set then muting pattern configuration should be a part of DL PRS Resource Pool configuration.

3.3 Predefined DL PRS Muting

As it was discussed in Section 3, the muting can be considered as the transmission schedule. If N orthogonal resources are allocated for transmission by NPRS stations, and there is a high loading per resource (NPRS/N) then muting can reduce number of stations transmitting on the same resource by switching off transmissions for half (or subset) of stations. However, muted stations should have opportunity for transmission at the next occasion while another half (or subset) of stations will be switched off. This problem formulation is equivalent to the design of transmission schedule with doubled amount of resources (e.g. 2N orthogonal resources). Solution for optimized transmission schedule across occasions was proposed in Section 3.

Figure 4K:
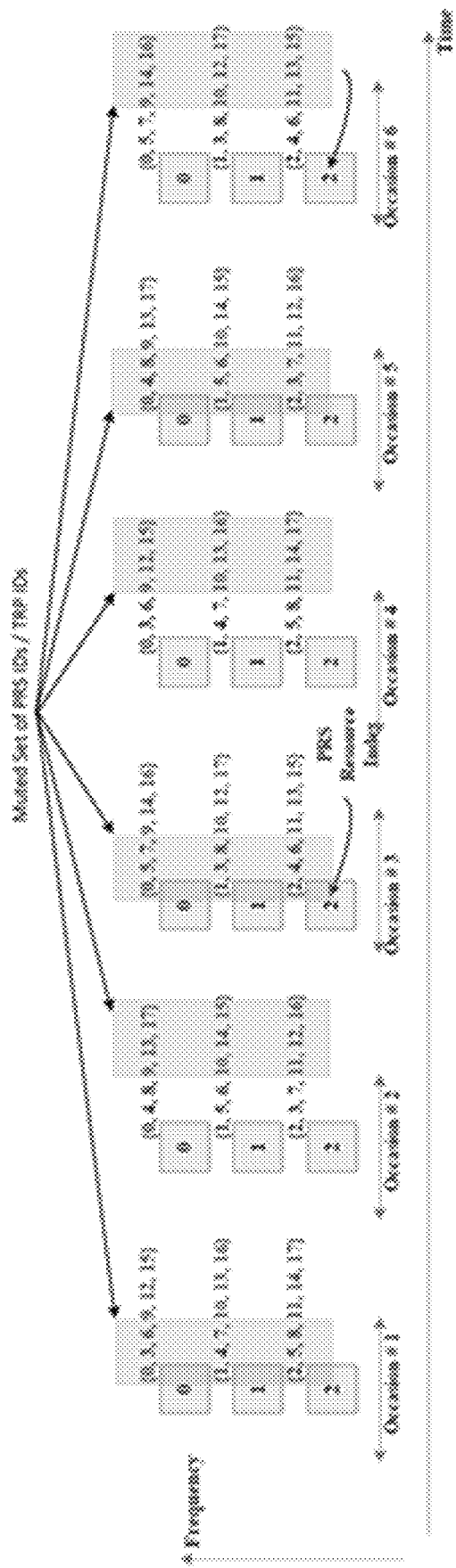
FIG. 4K illustrates an example of PRS muting applied on top of a PRS transmission schedule in accordance with some embodiments.

The muting may be applied on top of the transmission schedule and further optimize it. For instance, it can be used to reduce number or avoid intersecting elements among combinations of stations transmitting on different occasions or any other purpose. FIG. 4K illustrates an example of muting PRS IDs to avoid intersections in combinations occupying the same resource across different occasions.

In the general case, the following options can be applied for PRS muting in NR system:

Intra-Resource Muting: Muting of PRS transmissions on subset of time-frequency resources inside of DL PRS Resource;

Resource Level Muting: Muting of PRS transmissions on subset of DL PRS Resources inside of DL PRS Resource Set;

Resource Set Level Muting: Muting of PRS transmissions on subset of DL PRS Resource Sets within DL PRS Resource occasion;

TRP Level Muting: Muting of dedicated TRPs configured with a DL PRS Resource Sets.

In the next sub-sections, this disclosure illustrates DL PRS Resource and DL PRS Resource Set based muting as some promising approaches for NR positioning.

3.4 Randomized Muting Patterns

Similar to randomized DL PRS transmission schedule (resource allocation), the PRS muting can be also randomized across DL PRS occasions. As an example, the following mechanisms for muting pattern randomization can be used:

$N_{PRS-ID}$—maximum number of PRS IDs supported by specification;

$I_{PRS-ID}$—set of all PRS IDs, $I_{PRS-ID}=\{0, 1, \ldots, N_{PRS-ID}-1\}$;

$\hat{w}$—is the index of transmission occasion $0 \leq \hat{w} \leq \hat{w}_{max}$;

M—muting periodicity

K—number of transmission per muting period M

The node with PRS-ID $I_{PRS-ID}(m)$ will mute the PRS Resource Set in occasion $\hat{w}$, if parameter's value $j[\hat{w}]$ exceeds the value of K.

$$j[\hat{w}] = \text{floor}\left(\frac{x[\hat{w}]}{M}\right), x[\hat{w}] = \text{mod}(a \cdot x[\hat{w}-1], b)$$

$$x[-1] = \text{mod}(a \cdot (2 \cdot N_{PRS-ID} + I_{PRS-ID}(m) + 1), b),$$

$$a = 39827, b = 65537.$$

Figure 5:
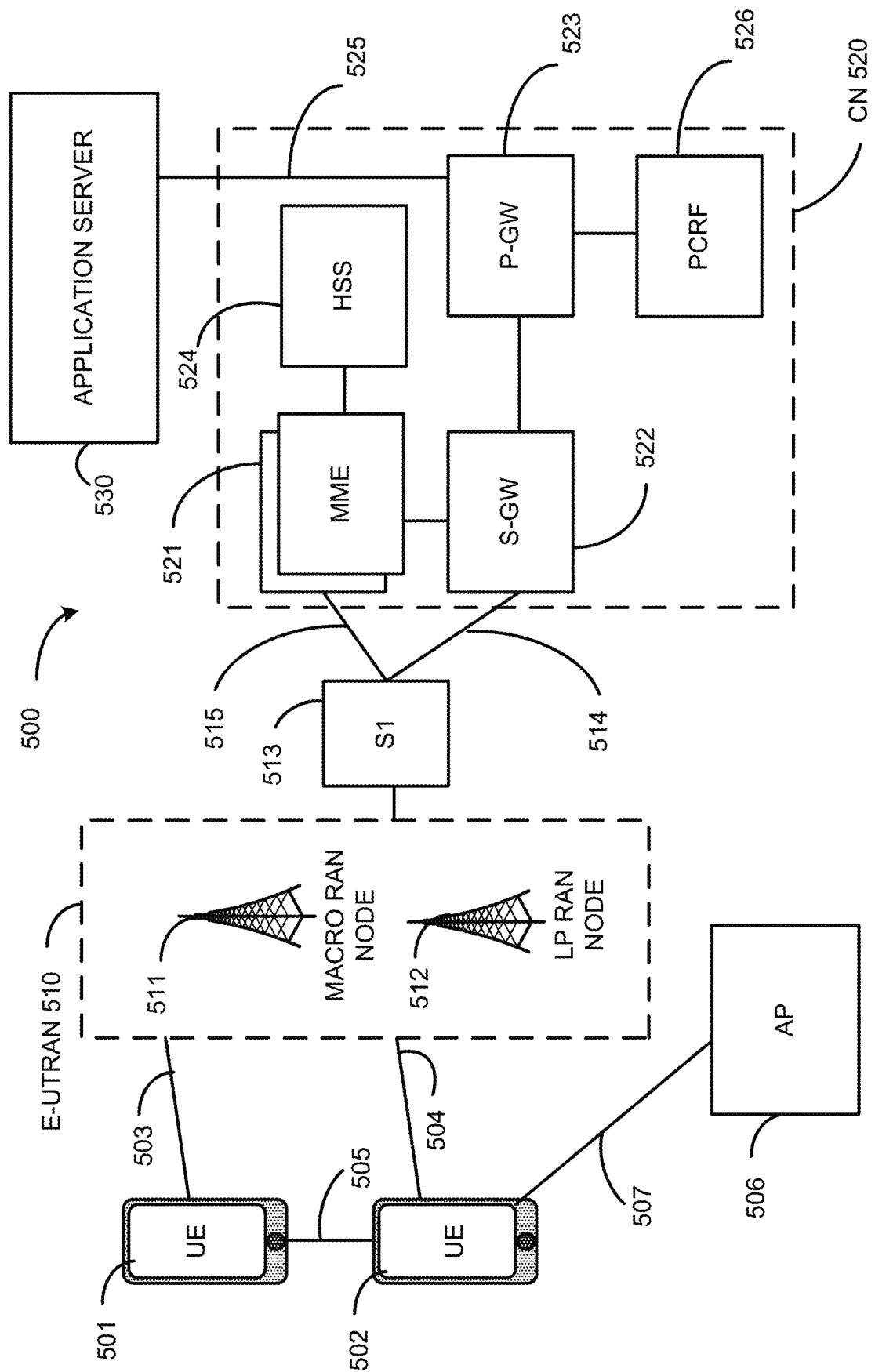
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
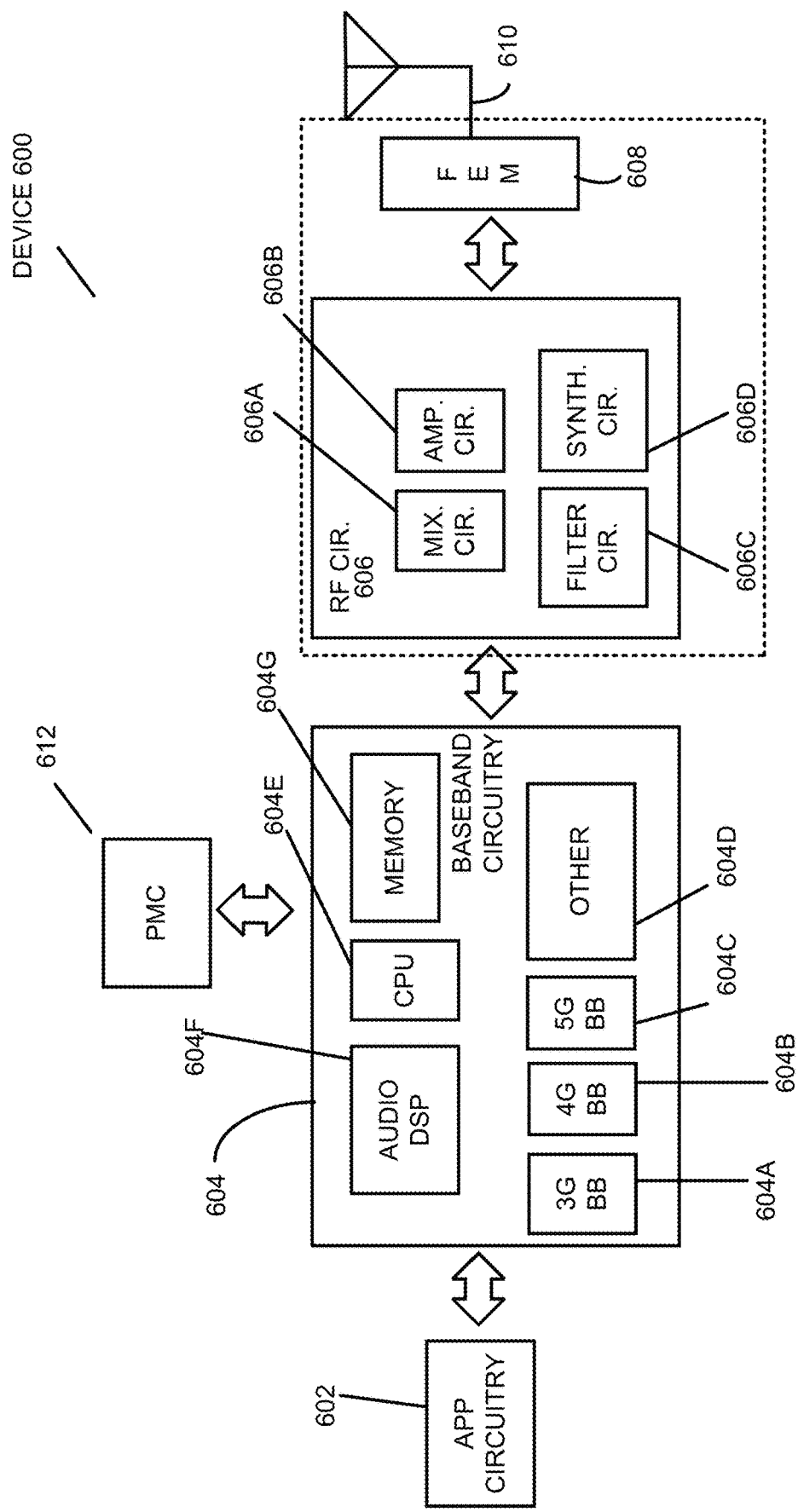
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606*a*, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
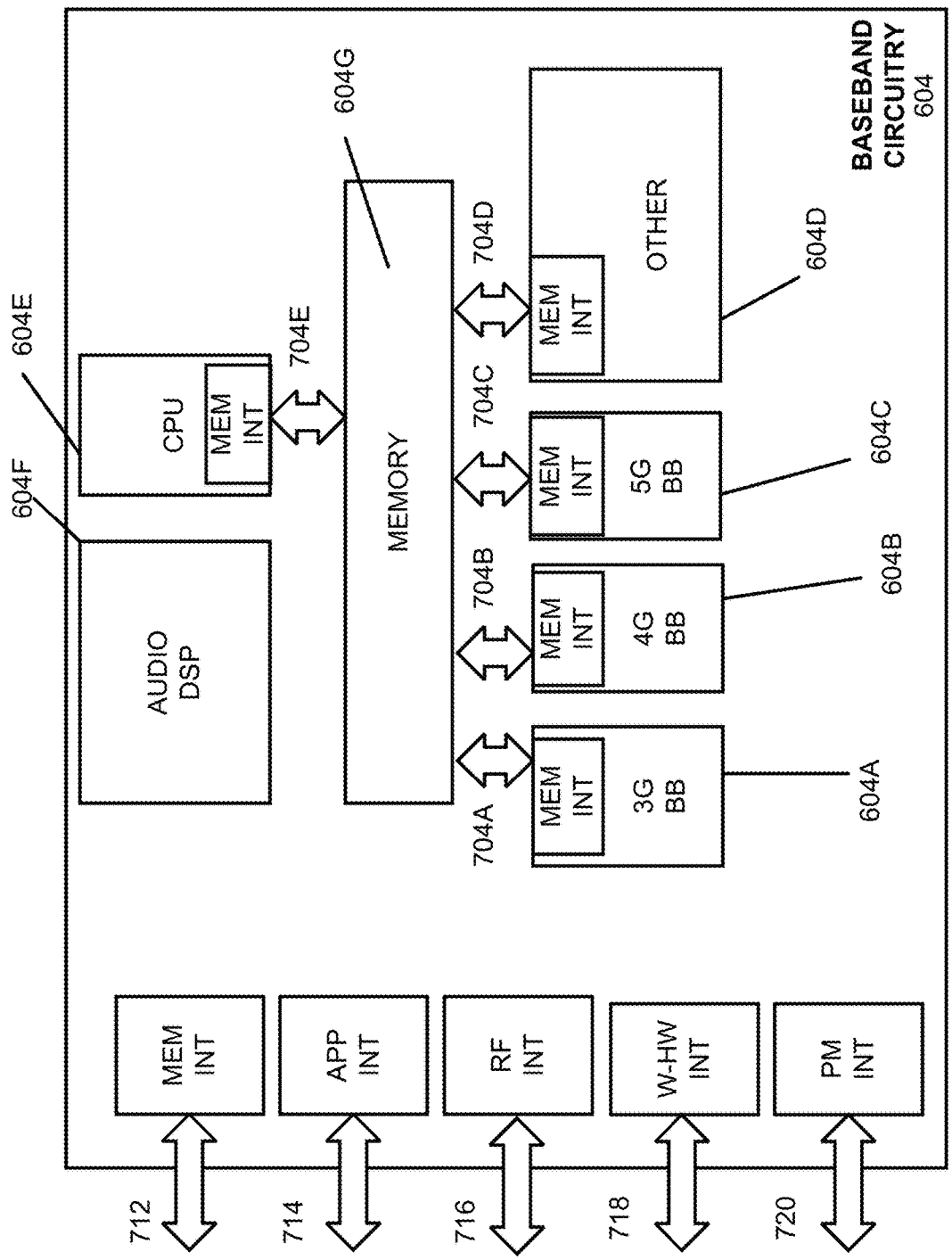
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
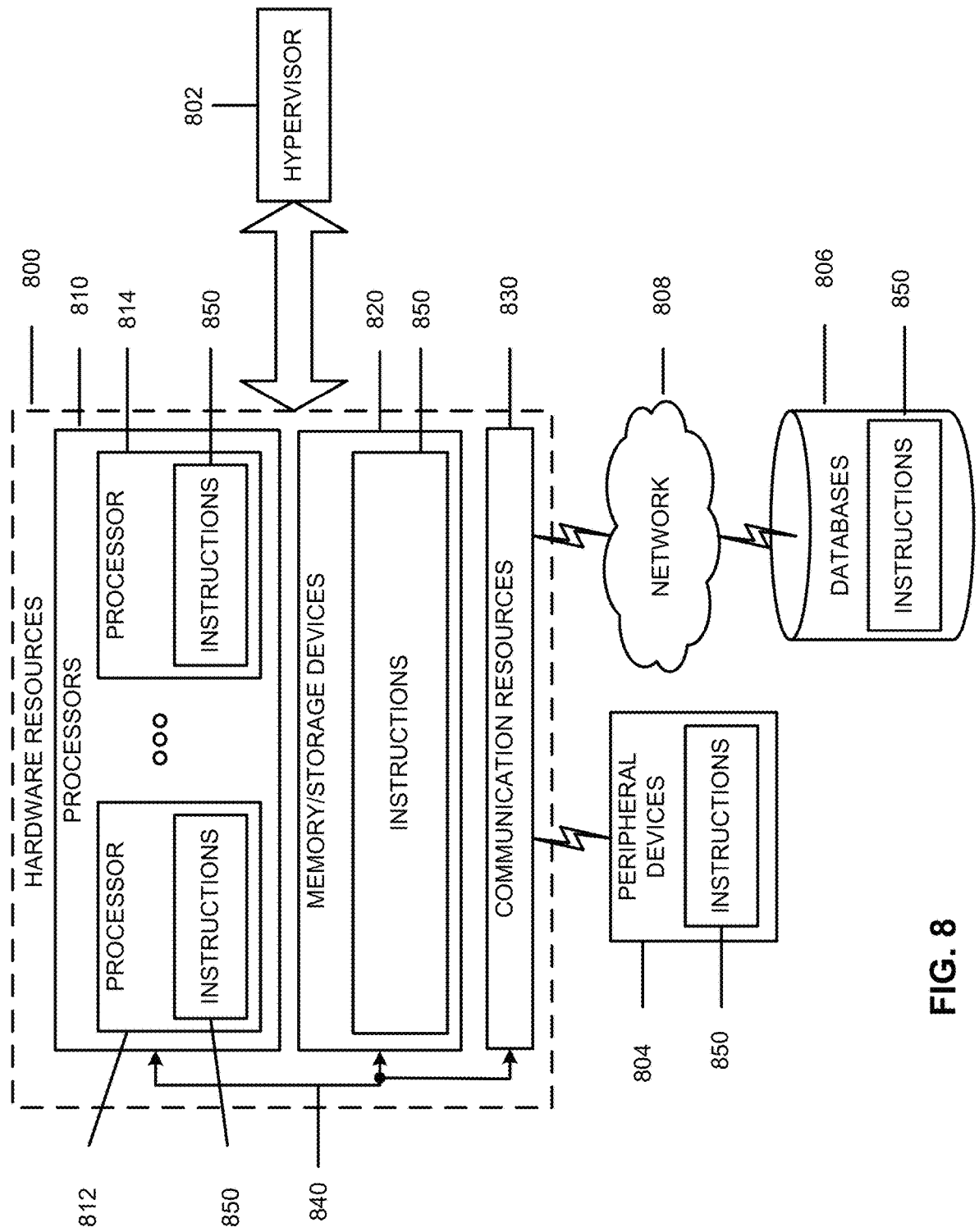
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 3:
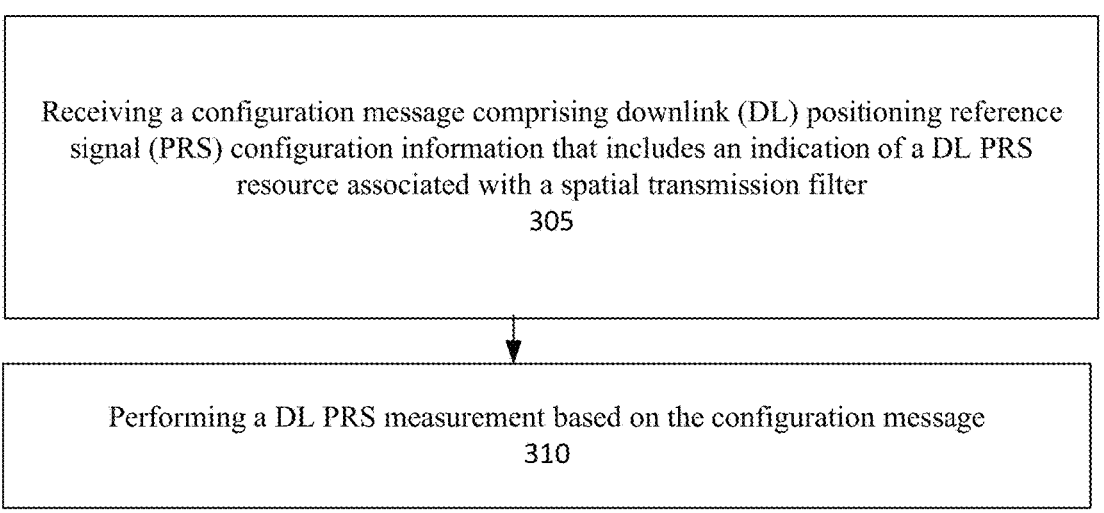

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) or portion thereof in some embodiments. In this example, operation flow/algorithmic structure 100 may include, at 105, retrieving downlink (DL) positioning reference signal (PRS) configuration information that includes an indication of a DL PRS resource associated with a spatial transmission filter. Operation flow/algorithmic structure 100 may further include, at 110, encoding a message for transmission to a user equipment (UE) that includes the DL PRS configuration information.

Another example of an operation flow/algorithmic structure is depicted in FIG. 2, which may be performed by a next-generation NodeB (gNB) or portion thereof in some embodiments. In this example, operation flow/algorithmic structure 200 may include, at 205, determining downlink (DL) positioning reference signal (PRS) configuration information that includes an indication of a DL PRS resource associated with a spatial transmission filter. Operation flow/algorithmic structure 200 may further include, at 210, encoding a configuration message for transmission to a user equipment (UE) that includes the DL PRS configuration information.

Another example of an operation flow/algorithmic structure is depicted in FIG. 3, which may be performed by a user equipment (UE) or portion thereof in some embodiments. In this example, operation flow/algorithmic structure 300 may include, at 305, receiving a configuration message comprising downlink (DL) positioning reference signal (PRS) configuration information that includes an indication of a DL PRS resource associated with a spatial transmission filter. Operation flow/algorithmic structure 300 may further include, at 310, performing a DL PRS measurement based on the configuration message.

EXAMPLES

Some non-limiting examples are provided below.

Example 1 includes an apparatus comprising: memory to store downlink (DL) positioning reference signal (PRS) configuration information; and processor circuitry, coupled with the memory, to: retrieve the DL PRS configuration information from the memory, wherein the DL PRS configuration information includes an indication of a DL PRS resource associated with a spatial transmission filter; and encode a message for transmission to a user equipment (UE) that includes the DL PRS configuration information.

Example 2 includes the apparatus of example 1 or some other example herein, wherein the DL PRS resource is associated with a spatial transmission filter inside a DL PRS occasion.

Example 3 includes the apparatus of example 1 or some other example herein, wherein the DL PRS configuration information includes an indication of a plurality of DL PRS resources associated with a plurality of spatial transmission filters, wherein each respective DL PRS resource is associated with a respective spatial transmission filter.

Example includes the apparatus of example 3 or some other example herein, wherein the plurality of DL PRS resources are associated with the plurality of spatial transmission filters across a plurality of DL PRS occasions.

Example 5 includes the apparatus of example 1 or some other example herein, wherein the DL PRS configuration information further includes an indication of a resource element (RE) offset pattern, and wherein the RE offset pattern indicates a comb size of 2, 4, or 6.

Example 6 includes the apparatus of example 1 or some other example herein, wherein the DL PRS configuration information further includes an indication of a DL PRS starting symbol offset.

Example 7 includes the apparatus of example 1 or some other example herein, wherein the DL PRS configuration information further includes an indication of DL PRS periodicity that is 4, 5, 8, 10, 16, 20, 32, 40, 64, 80, 160, 320, 640, 1280, or 2560 slots.

Example 8 includes the apparatus of example 1 or some other example herein, wherein the DL PRS configuration information further includes an indication of measurement quality, wherein the indication of measurement quality includes an estimate of uncertainty associated with a measurement, or an indication of error resolution.

Example 9 includes the apparatus of example 1 or some other example herein, wherein the DL PRS configuration information further includes an indication of a DL PRS resource muting pattern.

Example 10 includes one or more non-transitory computer-readable media storing instructions that, when executed by one or more processors, are to cause a next-generation NodeB (gNB) to: determine downlink (DL) positioning reference signal (PRS) configuration information that includes an indication of a DL PRS resource associated with a spatial transmission filter; and encode a configuration message for transmission to a user equipment (UE) that includes the DL PRS configuration information.

Example 11 includes the one or more non-transitory computer-readable media of example 10 or some other example herein, wherein the DL PRS resource is associated with a spatial transmission filter inside a DL PRS occasion.

Example 12 includes the one or more non-transitory computer-readable media of example 10 or some other example herein, wherein the DL PRS configuration information includes an indication of a plurality of DL PRS resources associated with a plurality of spatial transmission filters, wherein each respective DL PRS resource is associated with a respective spatial transmission filter.

Example 13 includes the one or more non-transitory computer-readable media of example 12 or some other example herein, wherein the plurality of DL PRS resources are associated with the plurality of spatial transmission filters across a plurality of DL PRS occasions.

Example 14 includes the one or more non-transitory computer-readable media of example 10 or some other example herein, wherein the DL PRS configuration information further includes an indication of a resource element (RE) offset pattern, and wherein the RE offset pattern indicates a comb size of 2, 4, or 6.

Example 15 includes the one or more non-transitory computer-readable media of example 10 or some other example herein, wherein the DL PRS configuration information further includes an indication of a DL PRS starting symbol offset, or an indication of DL PRS periodicity that is 4, 5, 8, 10, 16, 20, 32, 40, 64, 80, 160, 320, 640, 1280, or 2560 slots.

Example 16 includes the one or more non-transitory computer-readable media of example 10 or some other example herein, wherein the DL PRS configuration information further includes an indication of measurement quality, wherein the indication of measurement quality includes an estimate of uncertainty associated with a measurement, or an indication of error resolution.

Example 17 includes the one or more non-transitory computer-readable media of example 10 or some other example herein, wherein the DL PRS configuration information further includes an indication of a DL PRS resource muting pattern.

Example 18 includes one or more non-transitory computer-readable media storing instructions that, when executed by one or more processors, cause a user equipment (UE) to: receive a configuration message comprising downlink (DL) positioning reference signal (PRS) configuration information that includes an indication of a DL PRS resource associated with a spatial transmission filter; and perform a DL PRS measurement based on the configuration message.

Example 19 includes the one or more non-transitory computer-readable media of example 18 or some other example herein, wherein the DL PRS resource is associated with a spatial transmission filter inside a DL PRS occasion.

Example 20 includes the one or more non-transitory computer-readable media of example 18 or some other example herein, wherein the DL PRS configuration information includes an indication of a plurality of DL PRS resources associated with a plurality of spatial transmission filters, wherein each respective DL PRS resource is associated with a respective spatial transmission filter, and wherein the plurality of DL PRS resources are associated with the plurality of spatial transmission filters across a plurality of DL PRS occasions.

Example 21 includes the one or more non-transitory computer-readable media of example 18 or some other example herein, wherein the DL PRS configuration information further includes an indication of a resource element (RE) offset pattern, and wherein the RE offset pattern indicates a comb size of 2, 4, or 6.

Example 22 includes the one or more non-transitory computer-readable media of example 18 or some other example herein, wherein the DL PRS configuration information further includes an indication of a DL PRS starting symbol offset, or an indication of DL PRS periodicity that is 4, 5, 8, 10, 16, 20, 32, 40, 64, 80, 160, 320, 640, 1280, or 2560 slots.

Example 23 includes the one or more non-transitory computer-readable media of example 18 or some other example herein, wherein the DL PRS configuration information further includes an indication of measurement quality, wherein the indication of measurement quality includes an estimate of uncertainty associated with a measurement, or an indication of error resolution.

Example 24 includes the one or more non-transitory computer-readable media of example 18 or some other example herein, wherein the DL PRS configuration information further includes an indication of a DL PRS resource muting pattern.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, and/or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a method of communicating in a wireless network as shown and described herein.

Example 31 may include a system for providing wireless communication as shown and described herein.

Example 32 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
    memory to store downlink (DL) positioning reference signal (PRS) configuration information; and
    processor circuitry, coupled with the memory, to:
        retrieve the DL PRS configuration information from the memory, wherein the DL PRS configuration information includes:
            an indication of a DL PRS resource associated with a spatial transmission filter;
            an indication of DL PRS periodicity; and
            an indication of a DL PRS resource muting pattern that is based on a bitmap that indicates the DL PRS resource muting pattern; and
        encode a message for transmission to a user equipment (UE) that includes the DL PRS configuration information;
    wherein the DL PRS configuration information includes an indication of a plurality of DL PRS resources associated with a plurality of spatial transmission filters;
    wherein respective DL PRS resources of the plurality of DL PRS resources are associated with a respective spatial transmission filter of the plurality of spatial transmission filters; and
    wherein the plurality of DL PRS resources are associated with the plurality of spatial transmission filters across a plurality of DL PRS occasions.

2. The apparatus of claim 1, wherein the DL PRS resource is associated with a spatial transmission filter inside a DL PRS occasion.

3. The apparatus of claim 1, wherein the DL PRS configuration information further includes an indication of a resource element (RE) offset pattern, and wherein the RE offset pattern indicates a comb size of 2, 4, or 6.

4. The apparatus of claim 1, wherein the DL PRS configuration information further includes an indication of a DL PRS starting symbol offset.

5. The apparatus of claim 1, wherein the DL PRS configuration information further includes an indication of measurement quality, wherein the indication of measurement quality includes an estimate of uncertainty associated with a measurement, or an indication of error resolution.

6. One or more non-transitory computer-readable media storing instructions that, when executed by one or more processors, cause a user equipment (UE) to:
   identify, from a next-generation NodeB (gNB), a received configuration message that includes downlink (DL) positioning reference signal (PRS) configuration information, wherein the DL PRS configuration information includes:
      an indication of a DL PRS resource associated with a spatial transmission filter;
      an indication of DL PRS periodicity; and
      an indication of a DL PRS resource muting pattern that is related to a bitmap that indicates the DL PRS resource muting pattern; and
   perform a DL PRS measurement based on the configuration messages;
   wherein the DL PRS configuration information includes an indication of a plurality of DL PRS resources associated with a plurality of spatial transmission filters;
   wherein respective DL PRS resources of the plurality of DL PRS resources are associated with a respective spatial transmission filter of the plurality of spatial transmission filters; and
   wherein the plurality of DL PRS resources are associated with the plurality of spatial transmission filters across a plurality of DL PRS occasions.

7. The one or more non-transitory computer-readable media of claim 6, wherein the DL PRS resource is associated with a spatial transmission filter inside a DL PRS occasion.

8. The one or more non-transitory computer-readable media of claim 6, wherein the DL PRS configuration information further includes an indication of a resource element (RE) offset pattern, and wherein the RE offset pattern indicates a comb size of 2, 4, or 6.

9. The one or more non-transitory computer-readable media of claim 6, wherein the DL PRS configuration information further includes an indication of measurement quality, wherein the indication of measurement quality includes an estimate of uncertainty associated with a measurement, or an indication of error resolution.

10. The apparatus of claim 1, wherein the DL PRS periodicity is 4, 5, 8, 10, 16, 20, 32, 40, 64, 80, 160, 320, 640, 1280, or 2560 slots.

11. The one or more non-transitory computer-readable media of claim 6, wherein the DL PRS periodicity is 4, 5, 8, 10, 16, 20, 32, 40, 64, 80, 160, 320, 640, 1280, or 2560 slots.

12. One or more non-transitory computer-readable media storing instructions that, when executed by one or more processors, cause a next generation NodeB (gNB) to:
   generate a configuration message that includes downlink (DL) positioning reference signal (PRS) configuration information, wherein the DL PRS configuration information includes:
      an indication of a DL PRS resource associated with a spatial transmission filter;
      an indication of DL PRS periodicity; and
      an indication of a DL PRS resource muting pattern that is related to a bitmap that indicates the DL PRS resource muting pattern; and
   transmit the configuration message to a user equipment (UE) that is to perform a DL PRS measurement based on the configuration message;
   wherein the DL PRS configuration information includes an indication of a plurality of DL PRS resources associated with a plurality of spatial transmission filters;
   wherein respective DL PRS resources of the plurality of DL PRS resources are associated with a respective spatial transmission filter of the plurality of spatial transmission filters; and
   wherein the plurality of DL PRS resources are associated with the plurality of spatial transmission filters across a plurality of DL PRS occasions.

13. The one or more non-transitory computer-readable media of claim 12, wherein the DL PRS resource is associated with a spatial transmission filter inside a DL PRS occasion.

14. The one or more non-transitory computer-readable media of claim 12, wherein the DL PRS configuration information further includes an indication of a resource element (RE) offset pattern, and wherein the RE offset pattern indicates a comb size of 2, 4, or 6.

15. The one or more non-transitory computer-readable media of claim 12, wherein the DL PRS configuration information further includes an indication of measurement quality, wherein the indication of measurement quality includes an estimate of uncertainty associated with a measurement, or an indication of error resolution.

16. The one or more non-transitory computer-readable media of claim 12, wherein the DL PRS periodicity is 4, 5, 8, 10, 16, 20, 32, 40, 64, 80, 160, 320, 640, 1280, or 2560 slots.

\* \* \* \* \*

UNITED STATES PATENT AND TRADEMARK OFFICE
CERTIFICATE OF CORRECTION

| | |
|---|---|
| PATENT NO. | : 11,979,883 B2 |
| APPLICATION NO. | : 16/993032 |
| DATED | : May 7, 2024 |
| INVENTOR(S) | : Alexey Khoryaev et al. |

It is certified that error appears in the above-identified patent and that said Letters Patent is hereby corrected as shown below:

In the Claims

Column 25
Claim 6, Line 22, replace "messages;" which is after "configuration" with "message;".

Signed and Sealed this
Eleventh Day of June, 2024

Katherine Kelly Vidal
*Director of the United States Patent and Trademark Office*